United States Patent Office 3,592,901
Patented July 13, 1971

3,592,901
ANTIBACTERIAL SYNTHESIZED NITROFURYL DERIVATIVES
Erich Haack, deceased, late of Heidelberg, Germany, by Helmut Bernhard Haack, Gunhild Renate Haack, and Doris Leonie Haack, his heir and heiresses and legal representatives, Herbert Berger, Mannheim-Kafertal, and Wolfgang Vömel, Mannheim, Germany, assignors to Boehringer Mannheim GmbH, Mannheim, Germany
No Drawing. Continuation-in-part of application Ser. No. 739,600, May 10, 1968, which is a division of application Ser. No. 599,384, Dec. 6, 1966, which is a continuation-in-part of application Ser. No. 452,355, Apr. 10, 1965, which in turn is a continuation-in-part of application Ser. No. 351,841, Mar. 13, 1964. This application July 2, 1969, Ser. No. 840,599
Claims priority, application Germany, Mar. 20, 1963, B 71,208
Int. Cl. A61k 27/00
U.S. Cl. 424—263
3 Claims

ABSTRACT OF THE DISCLOSURE

Antimicrobial compositions containing as active ingredient a compound of the formula:

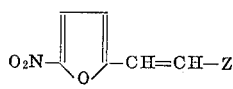

wherein Z is a member selected from the group consisting of α and γ pyridyl and wherein Z carries at least one substituent selected from the group consisting of polar and hydrophilic substituents of hydroxy, acetoxy, carboxy, amino, acetylamino, and the N-oxides thereof, and methods of using these compositions.

This application is a continuation-in-part of application Ser. No. 739,600 filed May 10, 1968 now abandoned which in turn is a division of application Ser. No. 599,384 filed Dec. 6, 1966 which in turn is a continuation-in-part of application Ser. No. 452,355 filed Apr. 10, 1965, now abandoned in turn a continuation-in-part of application Ser. No. 351,841 filed Mar. 13, 1964, now abandoned.

This invention relates to antimicrobial compositions which are effective against pathogenic micro-organisms, including bacteria, protozoa, and fungi.

More particularly, this invention relates to therapeutic compositions containing nitrofuryl derivatives as active ingredient, and to methods of using these compositions.

A great deal of work has been carried out in developing antimicrobial compositions such as the nitrofuryl compounds which act to relieve and eliminate the symptoms of microbial infections. In evaluating the usefulness of these antimicrobials, five interrelated factors need to be considered: (1) general antimicrobial activity; (2) specific antimicrobial activity; (3) period of effectiveness, i.e., whether the action is fleeting or prolonged; (4) deleterious side effects, and (5) the modes in which the substance may be effectively administered. The clinical usefulness of these compounds has heretofore been limited in that they have a weak and fleeting action, a high instance of undesirable, and sometimes deleterious, side effects and/or are limited by the mode in which they can be administered.

There has now been discovered and synthesized a new group of superior antimicrobial compounds having the structural formula:

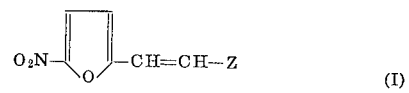 (I)

wherein Z is a member selected from the group consisting of α and γ pyridyl and wherein Z carries at least one substituent selected from the group consisting of polar and hydrophilic substituents of hydroxy, acetoxy, carboxy, amino, acetylamino, and the N-oxides thereof.

Experiments indicate that the compounds in accordance with the invention have marked prolonged antimicrobial action, little or no incidence of undesirable side effects enabling the administration of much greater amounts than heretobefore possible, and, furthermore, the compounds can be innocuously administered, parenterally, orally, and topically.

A preferred embodiment of this invention is the method of treating urinary infections which comprises administering to a subject having such infection a composition containing compounds of the Formula I.

It has also been found that in these compounds the nature and the position of the substituents on the pyridyl nucleus have an important influence on their spectrum of activity and are an indicia of the instances and situations where the administration of these substances is indicated.

The preparation of the new compounds is carried out using methods which are known to the art. A preferred method comprises the condensation of 5-nitrofurfurol or the diacetate thereof with a compound having the formula:

wherein Z has the same meaning as given above and B is two hydrogen atoms.

This reaction can, however, also be conducted by condensing 5-nitro-2-methyl-furan with an aldehyde having the formula:

wherein Z has the same meaning as given above.

In a further method of synthesizing the novel compounds of the invention, 5-nitrofurfurol is, for example, converted with a corresponding heterocyclically substituted alkylmagnesium halide or, alternatively, by reacting a substituted heterocyclic aldehyde or ketone with the Grignard compounds of 5-nitro-2-halogen methyl furan and thereafter dehydrogenating the compounds formed to produce the olefin.

It is also possible to use in the above-mentioned processes the corresponding un-nitrated furan derivatives as reaction components, in which case a nitration of the furan nucleus in the 5-position has to be carried out following the condensation.

In the case of many of the above substituents of the pyridine ring, it is advantageous not to introduce or split off the same until after the condensation has been completed. Thus, for example, the amino-substituted compounds are advantageously prepared by saponifying the corresponding acylamino compounds.

The new compounds can be converted in the conventional manner into their quaternary ammonium salts or into their N-oxides. Those skilled in the art can use well-known standard techniques for preparing the salts and the N-oxides.

The antimicrobial activities of some of the new nitrofuryl derivatives are compiled in the table below together with the three most potent known nitrofuryl compounds.

The new nitrofuryl derivatives assayed for antimicrobial activity and the known nitrofuryl compounds are as follows:

(1) 2-[2-(5-nitro-2-furyl)-vinyl]-pyridine-6-carboxylic acid (Example 2)
(2) 1-(5-nitro-2-furyl)-2-(2-amino-6-pyridyl)-ethylene (Example 11)
(3) 1-(5-nitro-2-furyl)-2-(4-acetamido-2-pyridyl)-ethylene (Example 19)
(4) 1-(5-nitro-2-furyl)-2-(2-acetamido-4-pyridyl)-ethylene (Example 24)
(5) 1-(5-nitro-2-furyl)-2-(6-hydroxy-2-pyridyl)-ethylene (Example 25)
(6) 1-(5-nitro-2-furyl)-(2-hydroxy-4-pyridyl)-ethylene (Example 26)
(7) 1-(5-nitro-2-furyl)-2-(4-hydroxy-2-pyridyl)-ethylene (Example 29)

(25) 1-(5-nitro-2-furyl)-2-(5-amino-2-quinoyl)-ethylene
(26) 1-(5-nitro-2-furyl)-2-(5-acetamino-2-quinoyl)-ethylene
(27) 1-(5-nitro-2-furyl)-2-(5-carboxy-2-quinoyl)-ethylene
(28) 1-(5-nitro-2-furyl)-2-(5-nitro-2-quinoyl)-ethylene
(29) 1-(5-nitro-2-furyl)-2-(6-acetamido-5-carboxy-2-quinoyl)-ethylene
(30) 1-(5-nitro-2-furyl)-2-(7-acetamido-2-quinoyl)-ethylene
(31) 1-(5-nitro-2-furyl)-2-(8-methoxy-2-quinoyl)-ethylene
(32) 1-(5-nitro-2-furyl)-2-(8-amino-2-quinoyl)-ethylene
(33) 1-(5-nitro-2-furyl)-2-(8-acetamido-2-quinoyl)-ethylene The Belgian Pat. 615,319 and 616,437 correspond to U.S. patent application Ser. No. 393,724 assigned to the same assignee as the instant application involved in an Interference with the Schmidt patent application Ser. No. 366,630, a precursor of U.S. Pat. 3,352,683.

TABLE I

| Type of organism | Absolute minimum bacteriostatic concentration in micrograms per milliliter for— | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Strain of organism: | | | | | | | | | | | | | | | |
| Staphylococcus aureus, SG 511 | 1 | 0.5 | 0.25 | 0.5 | 0.25 | 0.25 | 0.25 | 0.125 | 0.25 | 8 | 1 | 1 | 2 | 0.125 | 0.125 |
| Streptococcus pyogenes, Aronson | 16 | 2 | 0.031 | 0.5 | 0.5 | 0.25 | 0.5 | 0.25 | 0.25 | 4 | | | 0.25 | 1 | 1 |
| Escherichia coli | 0.5 | 0.031 | 0.008 | 0.031 | 0.031 | 0.062 | 0.062 | 0.031 | 0.062 | 8 | 0.125 | 0.125 | 0.25 | 0.06 | 0.031 |
| Proteus vulgaris | 64 | 16 | 64 | 16 | 0.5 | 1 | 2 | 2 | 2 | 256 | 16 | 8 | 16 | 16 | |
| Proteus mirabilis | | | | | | | | | | | | | | | 8 |
| Pseudomonas aeruginosa | >128 | 16 | 2 | 4 | 1 | 2 | 4 | 4 | 8 | 256 | 2 | 0.5 | 64 | 2 | >64 |
| Candida albicans | 128 | 2 | >64 | 128 | | | | | | | 0.5 | 2 | 128 | 0.5 | |
| Microsporum gypseum | 128 | 2 | 32 | 2 | | | | | | | 1 | 4 | 64 | 0.5 | |
| Trichophyton mentagrophytes | 64 | 2 | 32 | 8 | | | | | | | 2 | 2 | 1 | 1 | |
| Aspergillus niger | 128 | 1 | 32 | 64 | | | | | | | 2 | 2 | 16 | 4 | |

(8) 1-(5-nitro-2-furyl)-2-(4-acetoxy-2-pyridyl)-ethylene (Example 28)
(9) N-oxide of 1-(5-nitro-2-furyl)-2-(2-amino-6-pyridyl)-ethylene (Example 30)
(10) "Furadantin"=N-(5-nitro-furfurylidene)-1-amino-hydantoin
(11) 1-(5-nitro-2-furyl)-2-(α-pyridyl)-ethylene (Example 1, U.S. Pat. 3,352,683 (Schmidt) and Example 1 of Belgian Pat. 615,319)
(12) 1-(5-nitro-2-furyl)-2-(γ-pyridyl)-ethylene (Example 2 of Belgian Pat. 615,319)
(13) 1-(5-nitro-2-furyl)-2-(2-quinoyl)-ethylene (Example 4 of U.S. Pat. 3,352,683 (Schmidt) or Example 1 of Belgian Pat. 616,437)
(14) 1-(5-nitro-2-furyl)-2-(4-quinoyl)-ethylene (Example 2 of Belgian Pat. 616,437)
(15) 1-(5-nitro-2-furyl)-2-(2-methyl-6-pyridyl)-ethylene (Example 6 of U.S. Pat. 3,352,683 (Schmidt))
(16) 1-(5-nitro-2-furyl)-2-(5-bromo-8-hydroxy-2-quinoyl)-ethylene
(17) 1-(5-nitro-2-furyl)-2-(8-acetoxy-2-quinoyl)-ethylene (Example 5 of U.S. Pat. 3,352,683 (Schmidt))
(18) 1-(5-nitro-2-furyl)-2-(6-amino-2-quinoyl)-ethylene (Example 9 of U.S. Pat. 3,352,683 (Schmidt))
(19) 1-(5-nitro-2-furyl)-2-(8-hydroxy-2-quinoyl)-ethylene (Miura et al. II pages 293 and 295)
(20) N-oxide of 1-(5-nitro-2-furyl)-2-(2-quinoyl)-ethylene
(21) 1-(5-nitro-2-furyl)-2-(6-nitro-2-quinoyl)-ethylene (Example 7 of U.S. Pat. 3,352,683 (Schmidt))
(22) 1-(5-nitro-2-furyl)-2-(6-acetamido-2-quinoyl)-ethylene
(23) 1-(5-nitro-2-furyl)-2-(6-carboxy-2-quinoyl)-ethylene
(24) 1-(5-nitro-2-furyl)-2-(5,7-dichloro-8-hydroxy-2-quinoyl)-ethylene Table II

| Substance: | Bacterial maximum dilution of urine against E. coli |
|---|---|
| 1 | 1:29 |
| 2 | 1:84 |
| 3 | 1:90 |
| 4 | 1:42 |
| 5 | 1:600 |
| 6 | 1:34 |
| 7 | 1:455 |
| 8 | 1:175 |
| 9 | 1:217 |
| 10 | 1:19 |
| 11 | 1:16 |
| 12 | 1:6 |
| 13 | 1:3 |
| 14 | 1:2 |
| 15 | 1:20 |
| 16 | >1:2 |
| 17 | >1:2 |
| 18 | 1:8 |
| 19 | 1:5 |
| 20 | 1:2 |
| 21 | >1:2 |
| 22 | >1:2 |
| 23 | 1:3 |
| 24 | >1:2 |
| 25 | 1:6 |
| 26 | 1:2 |
| 27 | >1:2 |
| 28 | >1:2 |
| 29 | >1:2 |
| 30 | 1:2 |
| 31 | >1:2 |
| 32 | >1:2 |
| 33 | >1:2 |

By comparison of the data of Table I and Table II it can be seen, that the compounds of the invention have an antibacterial activity which is higher or at least comparable with the known substances but that the antibacterial activity in urine surprisingly is much greater in every instance than that of the known substances. Especially the unsubstituted pyridine and quinoline compounds exhibiting a similar activity as the hydrophilic or polar substituted compounds of this invention in vitro are less effective or nearly inactive in the urinary tract.

The following examples are given for the purpose of illustrating the new compounds and their preparation and are not to be taken as in any wise being a limitation thereof.

EXAMPLE 1

1-(5-nitro-2-furyl)-2-(6-carbomethoxy-2-pyridyl)-ethylene 26 grams 2-methyl-pyridine-6-carboxylic acid methyl ester and 24.45 g. crude 5-nitro-2-fural in 172 ml. acetic anhydride were heated together for 3 hours, under reflux, at 160° C. (bath temperature). Thereafter the mixture was evaporated to dryness, the residue taken up in 160 ml. dioxane and water added until turbidity set in. The resulting mixture was then subjected to treatment with activated charcoal. The thusly treated mixture was, while still hot, suction-filtered and water then added to the hot clear filtrate until turbidity had set in. The material which crystallized out on cooling was separated and recovered. 9.3 g. of crystalline material having a melting point of 151–153° C. were thus obtained. Following recrystallization out of trichloroethylene in the presence of activated charcoal, the yellow crystalline material which was recovered melted at 154–155° C.

$C_{13}H_{10}N_2O_5$ (274) Calcd. (percent): C, 56.90; H, 3.65; N, 10.22. Found (percent): C, 56.52; H, 3.66; N, 9.82.

EXAMPLE 2

2-[2-(5-nitro-2-furyl)-vinyl]-pyridine-6-carboxylic acid 2.74 grams carboxylic acid methylester obtained according to the procedure set out in Example 1 were dissolved in 50 ml. warm dioxane. 11 ml. normal caustic soda solution were added at room temperature to the resulting solution. The mixture was allowed to stand for one hour at room temperature and the crystals that separated out were suction-filtered and washed with 80% aqueous dioxane. The sodium salt of the carboxylic acid which was obtained by alkaline saponification of the methyl ester was dissolved in about 120 ml. warm water and 10 ml. of 2 N hydrochloric acid were then added to the resulting solution. The carboxylic acid which then separated out was recovered by suction filtering, washed with water and recrystallized from 80 ml. dioxane in the presence of activated charcoal. 1.55 g. of crystals having a melting point of 245–246° C. were obtained. An additional 0.35 g. of the acid could be isolated from the mother liquor by greatly concentrating the same under vacuum.

$C_{12}H_8N_2O_5$ (260) Calcd. (percent): C, 55.40; H, 3.08; N, 10.77. Found (percent): C, 55.70; H, 3.55; N, 10.80.

EXAMPLE 3

1-(5-nitro-2-furyl)-2-(2-amino-6-pyridyl)-ethylene 17.28 g. 2-amino-6-methylpyridine and 160 ml. acetic anhydride were heated for 15 minutes under reflux (160° C. bath temperature). Thereafter 22.4 g. crude 5-nitro-2-fural were added to the heated solution by using 4 portions of 5.6 g. each, spaced 2 hours apart, and the resulting mixture refluxed for a further 8 hours at a bath temperature maintained at 160° C. Following cooling, the material which had separated out was recovered by suction filtering and washed with glacial acetic acid back into the filtrate. This filtrate was then concentrated under vacuum. The concentrate was then taken up and boiled twice with 100 ml. portions of benzene and the benzene extracts combined and treated with a solution of 10 g. sodium bisulfite in 100 ml. water. Any unreacted 5-nitro-2-fural was removed. The resulting benzene solution was washed with water, dried and concentrated under vacuum. The concentration was taken up in approximately 100 ml. carbon tetrachloride and any undissolved matter separated out (0.7 g.). The clear organic solution remaining was then concentrated by evaporation. 25.5 g. of an oily residue were thus obtained.

The 0.7 g. undissolved material [crude 1-(5-nitro-2-furyl)-2-(2-acetamido-6-pyridyl)-ethylene] were hydrolyzed with 2 ml. glacial acetic acid and 2 ml. 6 N hydrochloric acid for 1 hour at 100° C., and the solution then concentrated by evaporation. The concentrate was dissolved in water and a little dilute hydrochloric acid with the application of heat, the undissolved matter removed, and the filtrate treated with activated charcoal. After filtration the filtrate, while still hot, was adjusted to a pH of about 10 with ammonia. The 1-(5-nitro-2-furyl)-2-(2-amino-6-pyridyl) - ethylene orange-colored crystals which were thus precipitated (0.25 g.) melted at 191–192° C.

The oily evaporation concentrate (25.5 g.) was also saponified with acid (70 ml. glacial acetic acid, 70 ml. 5 N hydrochloric acid), 1 hour at 100° C. and then vacuum concentrated. The concentrate was dissolved hot with 120 ml. 50% aqueous methanol solution and treated with activated charcoal. 0.6 g. of material having a melting point of 178–183° C. could be precipitated from the clear, still hot filtrate, by the addition thereto of excess ammonia. This product was dissolved in hot benzene, any undissolved matter was removed, and the filtrate concentrated by evaporation. The concentrate, following recrystallization from 10 ml. 50% aqueous dioxane solution, yielded 0.3 g. of crystals having a melting point of 189–190° C. and was identical with the above product.

$C_{11}H_9N_3O_3$ (231) Calcd. (percent): C, 57.1; H, 3.9; N, 18.18. Found (percent): C, 56.6; H, 3.88; N, 17.93.

EXAMPLE 4

1-(5-nitro-2-furyl)-2-(4-acetamido-2-pyridyl)-ethylene 3.4 g. 4-amino-2-methyl pyridine were heated under reflux for 30 minutes with 31.4 ml. acetic anhydride. Thereafter 4.5 g. 5-nitro-2-furfural were added, the resulting mixture was kept for another 3 hours at 160° C. (bath temperature) under reflux. Thereafter a further 1.5 g. nitrofurfural were added, the mixture was again held for 3 hours at 160° C. bath temperature, and a final 1.5 g. nitrofurfural introduced. The mixture was heated for 2 more hours at the temperature mentioned above. After standing overnight at room temperature, the precipitated material was suction-filtered, washed with a little glacial acetic acid, dried (4.5 g.) boiled 3 times with 50 ml. of a dioxane-toluene mixture (1:2), and the combined clear extract solutions evaporated using vacuum. The evaporation residue was taken up in a little 80% aqueous ethanol (0.2 g.) and recrystallized from isopropanol. Yellow crystals were obtained having a melting point of 223–225° C. (decomposition).

$C_{13}H_{11}N_3O_4$ (273) Calcd. (percent): C, 57.1; H, 4.03; N, 15.38. Found (percent): C, 57.62; H, 4.06; N, 14.92.

EXAMPLE 5

1-(5-nitro-2-furyl)-2-(2-acetamido-4-pyridyl)-ethylene 0.35 g. 1-(5-nitro-2-furyl)-2-(2-amino-4-pyridyl)-ethylene, prepared according to the method of Example 3 was heated for 30 minutes at 70° C. with 3.5 ml. acetic anhydride. The clear solution which was formed was evaporated under vacuum. The residue was taken up in ether and suction-filtered (0.4 g., melting point 188–190° C.). After recrystallization from dioxane, the crystalline compound melted at 190–191° C.

$C_{13}H_{11}N_3O_4$ (273) Calcd. (percent): C, 57.1; H, 4.03; N, 15.4. Found (percent): C, 56.94; H, 4.29; N, 14.96.

EXAMPLE 6

1-(5-nitro-2-furyl)-2-(6-oxy-2-pyridyl)-ethylene 0.92 g. 1-(5-nitro-2-furyl)-2-(6-amino-2-pyridyl)-ethylene, prepared according to the method of Example 3 was dissolved in 36 ml. of a warm mixture of 20 ml. water, 8 ml. concentrated sulfuric acid, and 28 ml. dioxane. A solution of 1 g. sodium nitrite in 5 ml. water was added with stirring at room temperature. Following standing for 15 to 30 minutes at room temperature the mixture was slowly heated to 100° C. Following evaporation under vacuum and diluting with water concentrated ammonia was added until pH 3 was reached. The orange-colored crystals were filtered off with suction, washed with water and dried in a vacuum (yield 1 g.). After recrystallization from a mixture of dioxane and dimethylformamide (3:1) the 1-(5-nitro-2-furyl)-2-(6-oxy-2-pyridyl)ethylene melted at 279° C. (decomposition).

$C_{11}H_8N_2O_4$ (232) Calcd. (percent): C, 56.9; H, 3.45; N, 12.07. Found (percent): C, 56.36; H, 3.8; N, 12.04.

The substance dissolved with a deep orange color in excessive diluted caustic soda and precipitated after acidifying the solution with diluted hydrochloric acid.

EXAMPLE 7

1-(5-nitro-2-furyl)-(2-hydroxy-4-pyridyl)-ethylene 0.7 g. 1-(5-nitro-2-furyl)-2-(2-amino-4-pyridyl)-ethylene prepared as set out in Example 3, was dissolved in a warm mixture of 10 ml. water, 4 ml. concentrated sulfuric acid, and 14 ml. dioxane. An ice-cold solution of 0.78 g. sodium nitrite in 3.6 ml. water was then poured into the mixture under stirring and at room temperature. The mixture was stirred for another 30 minutes at room temperature and heated up to 50° C. for 10 minutes, diluted with water and adjusted to a pH value of about 3 with strong aqueous ammonia solution. The crystals thereupon formed were filtered off, washed with water and dried. 0.5 g. of crystals were then recrystallized from 4 ml. dimethyl formamide. The yellow crystals thus produced were washed with dioxane and dried. Yield—0.32 g. 4-[2-5-nitro-2-furyl)-vinyl]pyridone-2 having a melting point of 280–283° C. (decomp.).

$C_{11}N_8N_2O_4$ (232) Calcd. (percent): C, 56.8; H, 3.45; N, 12.07. Found (percent): C, 56.13; H, 3.78; N, 12.34.

EXAMPLE 8

1-(5-nitro-2-furyl)-2-(4-acetoxy-2-pyridyl)-ethylene 3 g. 4-nitro-2-methylpyridine were heated with 9 ml. acetanhydride and 3 g. 5-nitro-2-furfurol for 6 hours under reflux (160° C. bath temperature) and evaporated to dryness under vacuum. The residue was extracted with a mixture of toluene-dioxane (2:1). The extract was purified with active carbon and the clear solution obtained after filtration evaporated under vacuum. The recovered residue (4.6 g.) was taken up in a small amount of methanol whereby 1.6 g. of crystals were obtained which following recrystallization from 5 ml. dioxane-ethanol (1:1) melted at 144–146° C.

$C_{13}H_{10}N_2O_5$ (274) Calcd. (percent): C, 56.95; H, 3.65; N, 10.22. Found (percent): C, 56.48; H, 3.84; N, 9.9.

EXAMPLE 9

1-(5-nitro-2-furyl)-2-(4-hydroxy-2-pyridyl)-ethylene

Variant I: 1-(5-nitro-2-furyl)-2-(4-amino-2-pyridyl)-ethylene.—0.25 g. of the compound prepared according to the procedure set out in Example 4 were dissolved in a mixture of 1.3 ml. 5 N HCl and 1.3 ml. dioxane and the resulting solution heated for ½ hour at 100° C. (bath temperature). Following evaporation under vacuum, the residue was dissolved with a little water-dioxane mixture (1:1) and one drop of 2 N HCl, filtered off from the undissolved material, and the clear filtrate treated with concentrated ammonia until it had become basic. The thus precipitated product (0.12 g.) decomposed following washing with water and drying at about 203° C. (discoloration from 190° C. on).

$C_{11}H_9N_3O_3$ (231) Calcd. (percent): C, 57.1; H, 3.9; N, 18.18. Found (percent): C, 56.74; H, 4.18; N, 18.02.

14.8 g. 1-(5-nitro-2-furyl)-2-(4-amino-2-pyridyl)ethylene prepared according to the above were dissolved in 106 ml. of a warm mixture of 50 ml. water, 20 ml. concentrated sulfuric acid and 70 ml. dioxane. The mixture at a temperature of 15–20° C. was added dropwise to an ice-cold solution of 16.2 g. sodium nitrite in 75 ml. water under stirring. The resulting mixture was stirred for another 30 minutes at room temperature. The yellow precipitate which formed was separated off with suction and washed with water (15.5 g.). The crystals were thereafter heated in a mixture of glacial acetic acid/concentrated hydrochloric acid (1:1) for 30 minutes under reflux. Following cooling, the crystals were filtered off with suction and dried (12.6 g.). After recrystallization out of 400 ml. of 60% aqueous dioxane under addition of 5 ml. concentrated hydrochloric acid and active carbon, the crystals were dried under vacuum at 120° C. and then melted at 273–277° C. (decomposition with foaming in the aluminum block in 8 minutes). The yield of 1-(5-nitro-2-furyl)-2-(4-hydroxy-2-pyridyl)-ethylene hydrochloride amounted to 9.1 g.

$C_{11}H_8N_2O_4 \cdot HCl$ (268.5) Calcd. (percent): N, 10.42; Cl, 13.22. Found (percent): N, 10.18; Cl, 13.07.

The hydrochloride was suspended in water and brought to solution by the addition of 2 N NaOH. The undissolved material was filtered off and the filtrate acidified with acetic acid. The olive-yellow crystals which formed were separated by suction-filtering, washed with water and dried. The dried crystals melted at 262° C. (decomposition with foaming in the aluminum block in heating for 8 minutes).

$C_{11}H_8N_2O_4$ (232) Calc. (percent): C, 56.8; H, 3.45. Found (percent): C, 56.7; H, 3.41.

Molecular weight: 234. (Potentiometric titration with $HClO_4$ in glacial acetic acid.)

Variant II: 19.8 g. 4-nitro-2-picoline were heated under reflux with 58 ml. acetanhydride and 22 g. 5-nitro-2-furfural for 9 hours and thereafter evaporated in vacuum. The black-brown residue was then heated with 100 ml. toluene to which a few drops of acetanhydride had been added and then filtered hot following addition of active carbon. The clear filtrate was then evaporated under vacuum. There were recovered 28 g. crude 1-(5-nitro-2-furyl)-2-(4-acetamido-2-pyridyl)-ethylene which could be used directly without further purification or which if desired could be extracted with ether before being worked further.

26 g. crude 1-(5-nitro-2-furyl)-2-(4-acetamido-2-pyridyl)-ethylene were heated to 60° C. for 1½ hours with 78 ml. of a mixture of 5 N hydrochloric acid and dioxane (1:1). Following cooling the precipitate which had formed was removed by suction filtering. 5.3 g. 1-(5-nitro-2-furyl)-2-(4 - hydroxy - 2 - pyridyl)ethylene hydrochloride were recovered which were purified by drying and heating with toluene. The dissolved crystallate was treated with active carbon, and 60% aqueous dioxane. Dilute hydrochloric acid was then added to the resulting solution. Following drying at 120° C. in vacuum, the compound melted at 269–273° C. (decomposition, following heating for about 8 minutes in the aluminum block).

$C_{11}H_8N_2O_4 \cdot HCl$ (268.5) Calc. (percent): C, 59.15; H, 3.35; N, 10.42; Cl, 13.22. Found (percent): C, 49.45; H, 3.79; N, 10.41; Cl, 13.24.

EXAMPLE 10

(1) 2.31 g. 1-(5-nitro-2-furyl)-2-(6-amino-2-pyridyl)-ethylene were dissolved in 20 ml. dimethylformamide. 11.2 ml. of a 5% solution of peroxybenzoic acid in chloroform were added to the solution and it was allowed to stand for 30 minutes. After that time a further 11.2 ml. of the same solution were added and the solution allowed to stand for another 30 minutes. A final 11.2 ml. of 5% peroxybenzoic acid in chloroform were then added and the solution allowed to stand for 1 to 2 days. Thereafter under stirring 200 ml. of a mixture of ether benzene (1:1) were added, the precipitate which formed separated by suction and the clear filtrate evaporated under vacuum. The residue was taken up in 200 ml. ether and the solid material (1.35 g.) crystallized out of 17 ml. 80% aqueous dioxane. There were recovered 0.75 g. of orange-red crystals having a melting point of 233–234° C. (decomposition; decolorizing at 215° C.). If desired, the crystals can be recrystallized from a mixture of dioxane-dimethylformamide (1:1).

(2) 8.1 g. 1-(5-nitro-2-furyl)-2-(2-amino-6-pyridyl)-ethylene were dissolved in 49 ml. of a warm mixture of dioxane-dimethylformamide (3:1). There were introduced at 10–20° C. into this solution in portions a solution of 5.8 g. peroxybenzoic acid in 80 ml. chloroform under cooling so that the temperature did not rise above +20° C. After about 24 hours of standing at room temperature, the red crystals which formed were separated off with suction. The yield amounted to 2.7 g. The chloroform mother liquor was treated with water in an amount corresponding to the volume of liquor, neutralized with sodium bicarbonate and there were recovered a further 3.55 g. of desired material. 4.2 g. of the combined material were crystallized out of 93 ml. 60% aqueous dimethylformamide (addition of active carbon). The recovered product melted at 235° C. (foaming). It is the same product as described above under (1), namely the N-oxide of 1-(5 - nitro-2-furyl)-2-(2-amino-6-pyridyl)-ethylene.

The compositions of the invention are put up in any suitable dosage form such as tablets, or the common powder-mix papers, or capsules, for oral administration. They can also be, when dissolved in water, introduced directly into the natural or pathological cavities of the organisms, such as the blood vessels, the urethra and bladder, the veins and ureters, the digestive system and annexed parts, etc. Additionally, the compounds of the invention may be applied topically in the form of lotions, salves, and unguents. In all cases there is preferably included a suitable diluent, carrier or binder, as the case may require, the same being per se non-toxic when taken in the amount and frequency resulting from the administration regimen of the preparation.

EXAMPLE 11

Tablets containing 100 mg. of 2-[2-(5-nitro-2-furyl)-vinyl]-pyridine-6-carboxylic acid were prepared by mixing 100 mg. 2-[2-(5-nitro-2-furyl)-vinyl]-pyridine-6-carboxylic acid with 25 mg. of amylum, 13 mg. of talcum, 10 mg. of agar-agar, 1.5 mg. of magnesium-stearate, 0.5 mg. of Aerosil (finely dispersed silicic acid) and 100 mg. of milk sugar. This mixture was pressed to form tablets weighing 250 mg. each containing 100 mg. of the active substance.

Each of 6 persons were administered one tablet containing 100 mg. of the active ingredients orally and their urine collected. The following amounts were recovered from the collected urine within the first two hours 31.24 mg.; during the third and fourth hour 21.17 mg.; between the fifth and sixth hour 10.58 mg.; and between the seventh and eighth hour 2.47 mg. Thus during this time ⅔ of the administered amount was recovered from the urine.

EXAMPLE 12

100 mg. of 1-(5-nitro-2-furyl)-2-(2-amino-6-pyridyl)-ethylene-N-oxide were mixed with 148.0 mg. milk sugar, 2.0 mg. Aerosil (finely dispersed silicic acid), 2.4 mg. of talcum and 1.5 mg. of magnesium stearate. This mixture was pressed to form tablets containing 100 mg. of active ingredient.

EXAMPLE 13

15 g. of 1-(5-nitro-2-furyl)-2-(6-hydroxy-2-pyridyl)-ethylene were admixed with 54 g. of polyethylene glycol 20,000, 7.5 g. of an emulgator consisting of polyoxyethylene esterified with stearylic acid (Atlas Powder Company), 7.5 g. of polyvinyl pyrrolidone, 6.0 g. of amylopectine and 1.9 g. of Aerosil (finely dispersed silicic acid). This mixture was pressed into tablets. The tablets each had a weight of 273 mg. and contained 50 mg. of the active ingredient.

These tablets were administered to groups of 6 male adults each. Their urine was collected and microbiologically checked for the contents of active compounds.

44% of the active compound was recovered in the urine during the first 8 hours. The maximum concentration of active ingredient was found to be 0.252 to 0.4 µg./ml. which levels are fully sufficient to kill typical bacteria associated with urinary infections such as *Escherichia coli*, *Streptococcus faecalis*, *Staphylococcus aureus*, *Aerobacter aerogenes* and *Pseudomonas aeruginosa*. The average time over which a high concentration of the active compound was found in the urine generally was more than 4 hours, this being sufficient to treat human beings affected with urinary infections.

A dosage unit of the compounds should be between 50 and 200 mg. of active ingredient. These amounts may be administered up to 5 times a day. Preferably 200 to 300 mg. should be administered per day.

What is claimed is:

1. An antibacterial composition in dosage unit form comprising an antibacterial effective amount of 2-[2-(5-nitro - 2 - furyl)-vinyl]-pyridine-6-carboxylic acid and a pharmaceutical carrier.

2. An antibacterial composition in dosage unit form comprising an antibacterial effective amount of 1-(5-nitro-2- furyl) - 2 - (2-amino-6-pyridyl)-ethylene-N-oxide and a pharmaceutical carrier.

3. An antibacterial composition in dosage unit form comprising an antibacterial effective amount of 2-[2-(5-nitro - 2 - furyl) - vinyl]-pyridine-6-carboxylic acid-β-oxyethylamide and a pharmaceutical carrier.

References Cited

UNITED STATES PATENTS 3,352,683   11/1967   Schmidt et al. _____ 260—240

OTHER REFERENCES

Miura et al., J. Pharm. Soc., Japan, vol. 85, pp. 289 to 298.

JEROME D. GOLDBERG, Primary Examiner

UNITED STATES PATENT OFFICE
CERTIFICATE OF CORRECTION

Patent No. 3,592,901     Dated August 20, 1971

Inventor(s) Erich Haack et al.

It is certified that error appears in the above-identified patent and that said Letters Patent are hereby corrected as shown below:

Column 8, line 67

"59.15" should be ---49.15---

Signed and sealed this 7th day of December 1971.

(SEAL)
Attest:

EDWARD M. FLETCHER, JR.      ROBERT GOTTSCHALK
Attesting Officer            Acting Commissioner of Patents